United States Patent
Kim et al.

(10) Patent No.: US 11,391,489 B2
(45) Date of Patent: Jul. 19, 2022

(54) LIQUID HEATER

(71) Applicant: LG ELECTRONICS INC., Seoul (KR)

(72) Inventors: Kyucheol Kim, Seoul (KR); Jaewoo Kim, Seoul (KR); Yuheon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/941,741

(22) Filed: Jul. 29, 2020

(65) Prior Publication Data

US 2021/0222911 A1     Jul. 22, 2021

(30) Foreign Application Priority Data

Jan. 20, 2020 (KR) .......................... 10-2020-0007318

(51) Int. Cl.
*F24H 9/02* (2006.01)
*F24D 11/02* (2006.01)
(Continued)

(52) U.S. Cl.
CPC ........... *F24H 9/02* (2013.01); *F24D 11/0228* (2013.01); *F24H 9/1818* (2013.01);
(Continued)

(58) Field of Classification Search
CPC . F24H 1/182; F24H 1/185; F24H 9/02; F24H 9/2021; F24H 1/181; F24H 4/02;
(Continued)

(56) References Cited

U.S. PATENT DOCUMENTS 5,020,481 A * 6/1991 Nelson .................... F24H 1/182
                                                      122/494
5,163,119 A * 11/1992 Windon .................. F24H 1/182
                                                      264/46.7
(Continued)

FOREIGN PATENT DOCUMENTS

CN         104422131        3/2015
DE     20-2014-002656       6/2015
(Continued)

OTHER PUBLICATIONS

Screen captures from YouTube video clip entitled "Introducing the Rheem Prestige Series Combination Boiler," 3 pages, uploaded on Feb. 5, 2019 by user "Rheem". Retrieved from Internet: <https://www.youtube.com/watch?v=l1GkizDtOOM> (check at about 50-55 seconds). (Year: 2019).*

(Continued)

*Primary Examiner* — Steven B McAllister
*Assistant Examiner* — Benjamin W Johnson
(74) *Attorney, Agent, or Firm* — KED & Associates LLP

(57) ABSTRACT

A liquid heater may heat liquid using at least one of an electric heater or a hybrid heat pump. The liquid heater includes a tank to store liquid, an insulator at an outer surface of the tank, and a case surrounding the insulator. The case includes a first outer panel, a second outer panel, and a cover panel fastened between the first outer panel and the second outer panel. The cover panel is detachable from the liquid heater to access electronic devices such as a controller for the electric heater.

18 Claims, 14 Drawing Sheets

(51) Int. Cl.
*F24H 9/20* (2022.01)
*G06F 3/147* (2006.01)
*F24H 9/1818* (2022.01)
*F24H 1/18* (2022.01)
*F28D 1/06* (2006.01)
*F24H 4/04* (2006.01)
*F24H 1/12* (2022.01)
*F24H 4/02* (2022.01)

(52) U.S. Cl.
CPC ........... *F24H 9/2021* (2013.01); *G06F 3/147* (2013.01); *F24H 1/122* (2013.01); *F24H 1/181* (2013.01); *F24H 1/182* (2013.01); *F24H 1/185* (2013.01); *F24H 4/02* (2013.01); *F24H 4/04* (2013.01); *F24H 9/2007* (2013.01); *F28D 1/06* (2013.01)

(58) Field of Classification Search
CPC . F24H 4/04; F24H 9/16; F24H 9/1818; F24H 9/2007; F24D 11/0228; F28D 1/06; G06F 3/147
USPC ........................................................ 122/19.2
See application file for complete search history.

(56) References Cited

U.S. PATENT DOCUMENTS

| | | | |
|---|---|---|---|
| 2005/0279116 A1* | 12/2005 | Park | F24F 13/28 |
| | | | 62/317 |
| 2012/0222631 A1 | 9/2012 | Lesage et al. | |
| 2017/0074544 A1* | 3/2017 | Lesage | H05B 1/0283 |
| 2018/0017286 A1 | 1/2018 | Bailey | |
| 2018/0163991 A1* | 6/2018 | Shaffer | F24H 1/185 |
| 2019/0086121 A1* | 3/2019 | Branecky | F24H 1/185 |
| 2019/0162443 A1* | 5/2019 | Stegemeyer | F41H 13/0087 |
| 2019/0178529 A1* | 6/2019 | Hou | F24H 9/02 |

FOREIGN PATENT DOCUMENTS

| | | | | |
|---|---|---|---|---|
| EP | 2933580 | | 10/2015 | |
| EP | 3462106 | | 4/2019 | |
| FR | 2548338 | A1 * | 1/1985 | ............... F24H 9/02 |
| JP | 2017-072366 | | 4/2017 | |
| KR | 20100122618 | A * | 11/2010 | |

OTHER PUBLICATIONS

European Search Report dated Mar. 31, 2021 issued in Application No. 20200251.5.

* cited by examiner

LIQUID HEATER

CROSS-REFERENCE TO RELATED APPLICATION(S)

This application claims the benefit of Korean Patent Application No. 10-2020-0007318, filed in Korea on Jan. 20, 2020, in the Korean Intellectual Property Office, the disclosure of which is incorporated herein in its entirety by reference.

BACKGROUND

1. Field

The present disclosure relates to a liquid heater.

2. Background

A water heater is an electric appliance that heats liquid such as water, generally using one of two heating schemes. The first scheme is to tightly attach a heater to an outer wall of a water tank to transfer resistance heat to liquid or water contained inside of the water tank. The second scheme is to install a heater inside of the water tank to heat the water through direct contact. These two schemes are generally used with electric heaters.

A third scheme involves a heat pump using a refrigerant cycle, which generally have greater heating efficiency than electric heaters. The heat pump scheme may include a heat exchange structure that transfers heat using a refrigerant, a refrigerant pipe for refrigerant circulation, and various other devices that convert a phase and a temperature of refrigerant. Chinese Patent No. 104422131, registered on Mar. 15, 2017, discloses a water heater using a heat pump scheme.

More recently, hybrid water heaters have been used, which employ both a heat pump scheme and an electric heater scheme. An external structure may protect internal heating elements and allow access for maintenance. However, in such a hybrid water heater, the external structure is prone to condensate created by the heat pump, and the condensate may penetrate into an inside of the external structure and cause malfunction.

In addition, as domestic water heaters become larger in size, an aesthetic appearance is becoming increasingly important. With the hybrid water heater, a panel covering the heat pump is often desired to conceal the heat pump.

BRIEF DESCRIPTION OF THE DRAWINGS

Embodiments will be described in detail with reference to the following drawings in which like reference numerals refer to like elements, and wherein.

DETAILED DESCRIPTION

Figure 1:
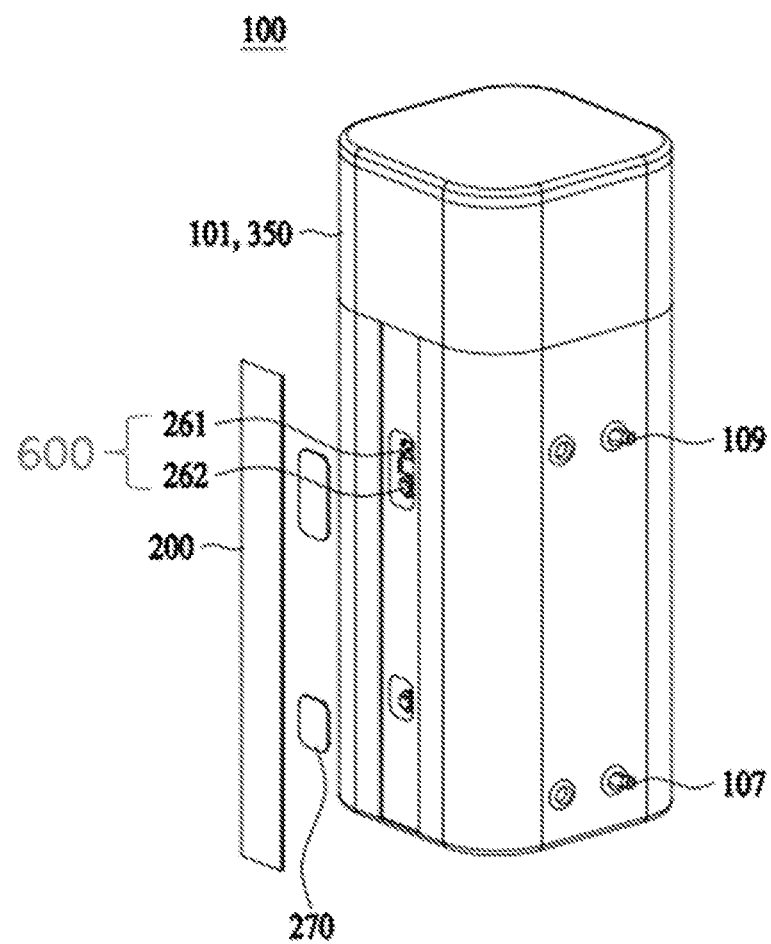
FIG. 1 is a perspective, partially exploded view illustrating an exterior of a water heater according to an embodiment.
Figure 2:
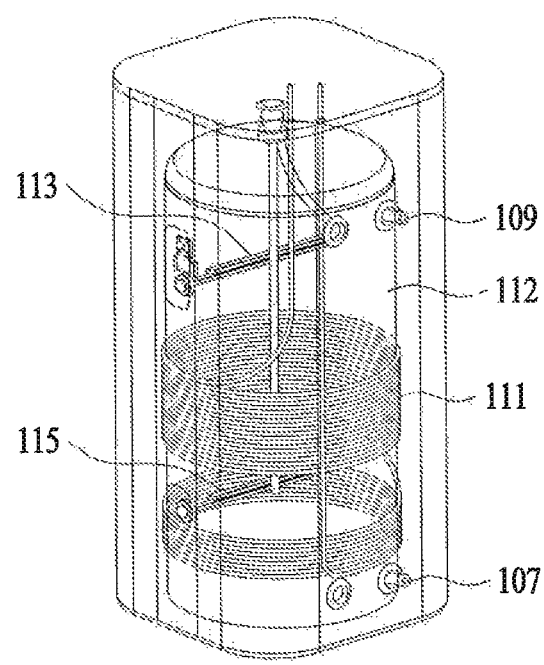
FIG. 2 is a perspective view illustrating an interior of a water tank according to an embodiment.

An overall structure of a water or liquid heater 100 according to an embodiment will be described first with reference to FIGS. 1 and 2. Referring to FIGS. 1 and 2, the liquid heater 100 may heat water or other liquid (hereinafter, "liquid") stored in a water or liquid tank 112 by using at least one of heaters 113 and/or 115 and a heat pump 101. Liquid may be supplied to the tank 112 via an inlet pipe 107, heated in the tank 112 via the heaters 113 and/or 115, and discharged at a set or predetermined temperature through an outlet pipe 109.

The heat pump 101 may employ a refrigerant cycle and include at least one of a compressor, a condenser, an expansion valve, and a heat exchanger. The compressor of the heat pump 101 may compress a refrigerant to a high temperature and a high pressure, and the condenser may heat liquid through heat exchange between the compressed high temperature refrigerant having passed through the compressor and lower temperature liquid.

A refrigerant pipe 111 connected to the condenser may be configured to surround an inner space of the tank 112. For example, the refrigerant pipe 111 may have a coil configuration running along an inner side of the tank 112. The compressed high temperature refrigerant may perform heat exchange with low temperature liquid stored in the tank 110 while flowing through the refrigerant pipe 111.

The condensed refrigerant may be introduced into the expansion valve. The expansion valve may be, for example, a linear expansion valve (LEV), and an opening degree of the expansion valve may be adjusted within a predetermined range to reduce pressure of the refrigerant. The refrigerant introduced into the heat exchanger through the expansion valve may be vaporized through heat exchange with ambient or outdoor air.

The heat pump 101 may have a relatively slow liquid heating rate compared to that of the heaters 113 and/or 115. The heaters 113 and/or 115 may be provided inside of the tank 112 to directly contact the liquid in the tank 112. The heaters 113 and 115 may be, for example, sheath heaters. Although two heaters 113 and 115 are shown in FIG. 1, such configuration is merely an example, and a number of heaters 113 and 115 is not limited to two. The heaters 113 and 115 may include an upper heater 113 to heat liquid stored in the upper portion of the tank 112 and a lower heater 115 to heat liquid stored in the lower portion of the tank 112, but embodiments disclosed herein are not limited.

A liquid heating rate of the upper and lower heaters 113 and 115 may be relatively faster than that of the heat pump 101, and the upper and lower heaters 113 and 115 may be primary heaters, while the heat pump 101 may be a secondary heater for smaller changes. FIG. 2 shows a possible positional relationship between the upper and lower heaters 113 and 115 and the refrigerant pipe 111. The refrigerant pipe 111 may be wrapped or spun in such a way as to form a lower coil and an upper coil. The lower heater 115 may be configured to extend across a top of the lower coil, and the upper heater 113 may be provided above and spaced apart from a top of the upper coil. If a heating efficiency of the upper and lower heaters 113 and 115 is significantly better than that of the heat pump 101, the positional relationship between the upper and lower heaters 113 and 115 and the refrigerant pipe 111 may not be limited to the example of FIG. 2.

The upper and lower heaters 113 and 115 may include a heat generator that generates heat upon application of power through a relay. An example of such upper and lower heaters 113 and 115 may be a sheath heater. An inside of the heat generator may be made of a conductive and rigid material (e.g., stainless steel). A heating element to generate heat according to an electrical connection (e.g., a nichrome wire having a coil shape) may be embedded in the conductive and rigid material.

The tank 112 may be configured to have a smooth external appearance and to ensure smooth functioning of a controller or heater circuit box 261, heaters 113 and 115, and/or devices of the refrigeration cycle of heat pump 101 of the liquid heater 100, improving convenience and aesthetics. A heater mount 262 may be provided at the tank 112 to support the heaters 113 and 115. The exterior of the liquid heater 100 will be described in more detail with reference to FIGS. 3-5, and the heater circuit box 261 and heater mount 262 will be described in more detail in FIG. 11.

Figure 3:
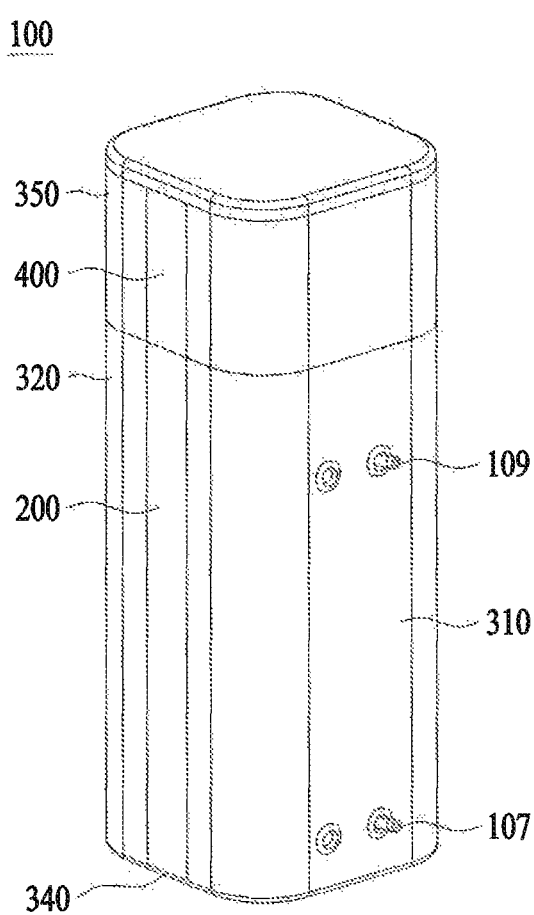
FIG. 3 is a perspective view illustrating an overall appearance of the exterior of the water heater according to an embodiment.
Figure 4:
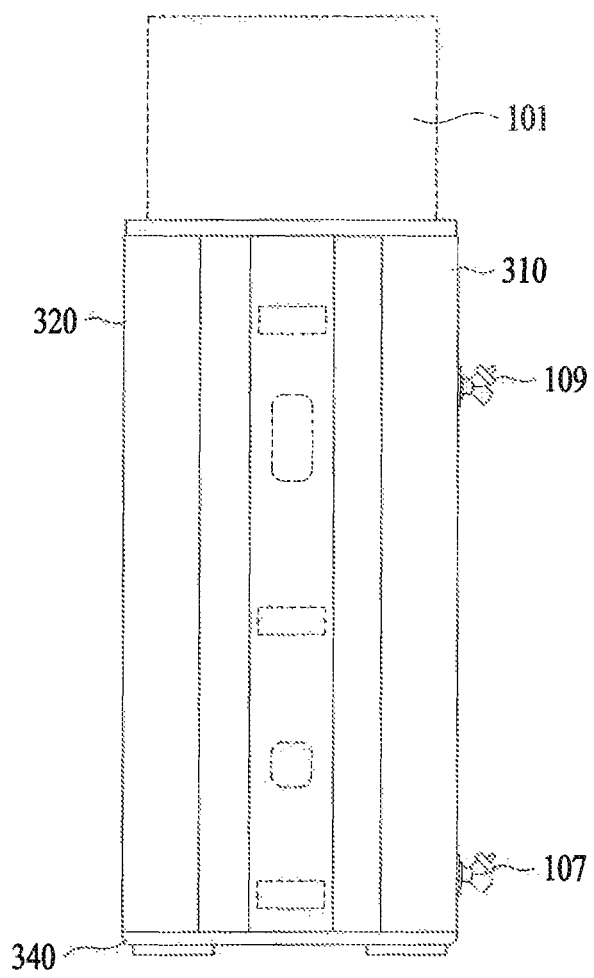
FIG. 4 is a front view of the exterior of the water heater according to an embodiment.
Figure 5:
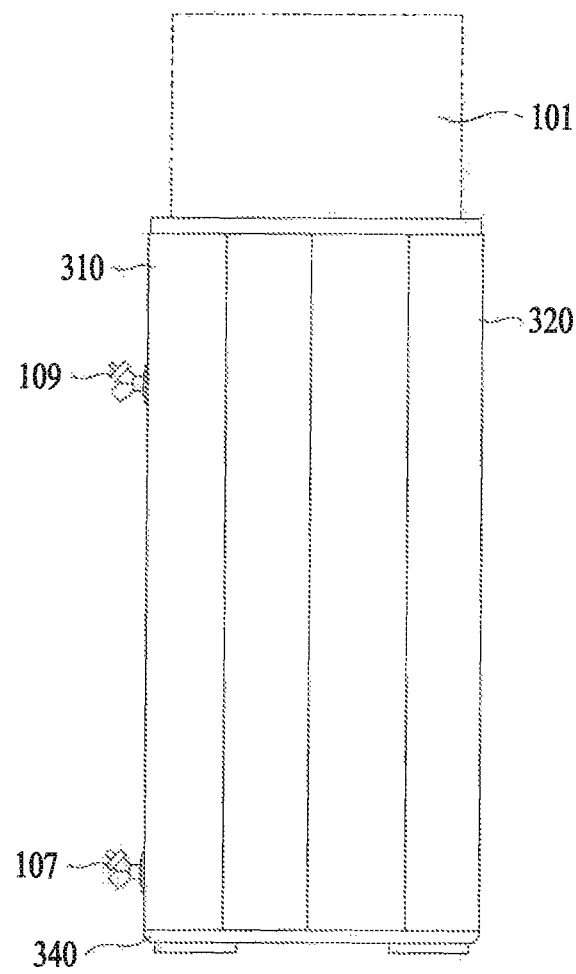
FIG. 5 is a rear view of the exterior of the water heater according to an embodiment.

Referring to FIGS. 3-5, the exterior of the liquid heater 100 may be a case or housing covering and protecting the tank 112. The exterior may include a cover panel 200, a first outer panel 310, a second outer panel 320, a bottom panel or base 340 forming a bottom of the liquid heater 100, and an upper panel or cap 350 forming an upper side of the liquid heater 100. The first and second outer panels 310 and 320 may be provided at sides of the tank 112 to cover the sides of the tank 112 and be coupled to each other. The cover panel 200 may be provided between the first outer panel 310 and the second outer panel 320 to form an external appearance of the liquid heater 100 along with outer surfaces of the first outer panel 310 and the second outer panel 320.

Figure 13:
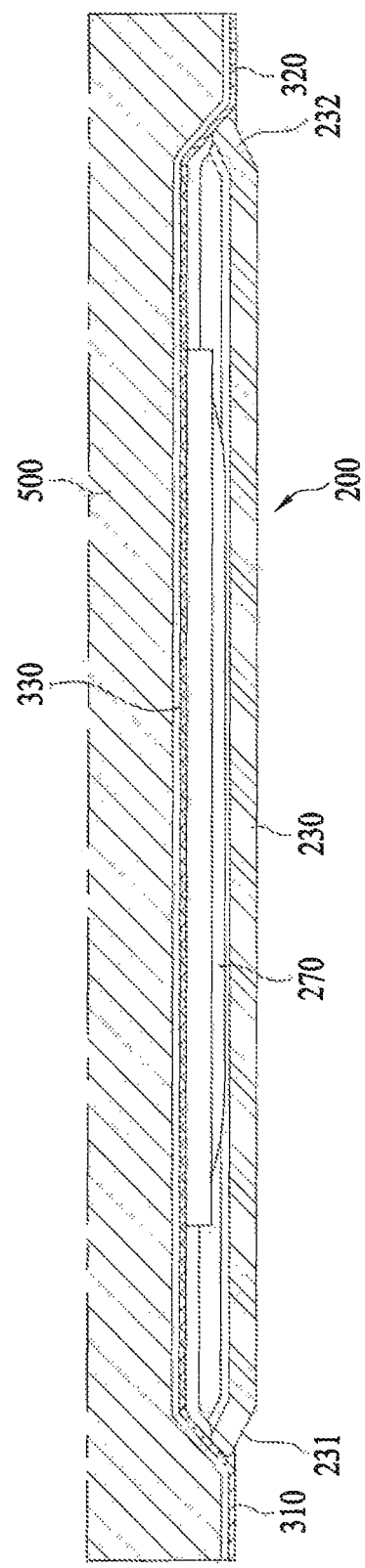
FIG. 13 is an enlarged cross-sectional view of portion D of FIG. 12.

The cover panel 200 may be coupled to a third outer panel 330 described later with reference to FIGS. 9, 10, and 13. Such third outer panel 330 may couple to and be flush with the first and second outer panels 310 and 320, and so the cover panel 200 may protrude slightly outward from the first and second outer panels 310 and 320 (FIG. 13). Alternatively, the third outer panel 330 may be formed to be thinner than the first and second outer panels 310 and 320, and the cover panel 200 may be configured to be flush with the first and second outer panels 310 and 320 so as to form a continuous exterior of the liquid heater 100. As another example, the third outer panel 330 may be omitted, and the cover panel 200 may couple directly to the first and second outer panels 310 and 320 and/or the tank 112.

The cap 350 may cover the heat pump 101. A display 400 may be provided on the cap 350, and a width of the cover panel 200 may be equal to a width of a display 400 to form a cohesive or continuous linear appearance. The first outer panel 310 and the second outer panel 320 may have shapes to correspond to a shape of a remaining portion of the outer surface of the cap 350, the remaining portion being a portion not having the display 400.

As an example of a shape of the exterior or case of the liquid heater 100, the exterior may have a rounded cuboid shape such that a transverse or horizontal cross section has a rounded square or rectangle shape. The first outer panel 310 may define a right side border, two right corners, and half of a top border, while the second outer panel 320 may define a left side border, two left corners, and half of the top border such that the first and second outer panels 310 and 320 surround the tank 112 except at a portion where the cover panel 200 and third outer panel 330 is configured to be coupled. However, embodiments are not limited to a rounded cuboid shape. For example, the exterior of the liquid heater 100 may be a cylinder, and the first and second outer panels 310, along with the cover panel, may have semicircular shapes.

A shape of the tank 112 may be cylindrical. Alternatively, the tank 112 may have a rounded cuboid shape or other shape. The exterior of the liquid heater 100 may not necessarily correspond to a shape of the tank 112. For example, in the drawings, the tank 112 is shown to be cylindrical, while the exterior is shown to have a rounded cuboid shape. However, the exterior of the liquid heater 100 could alternatively be formed to correspond to a shape of the tank 112 to reduce an overall size.

The display 400 may be provided at a center of a side (e.g., front side) of the cap 350 and may be configured to display a numerical value, such as a heating state of the liquid heater 100 or an internal temperature. The display 400 may be different in material or color from the cap 350 so as to be readily visible. The cover panel 200 may be formed to have an outer surface of a material or color identical or similar to that of the display 400. The first outer panel 310 and the second outer panel 320 may be formed to have outer surfaces of a material or color identical or similar to that of the cap 350. Such a color or material configuration may make the liquid heater 100 readily identifiable and aesthetically pleasing. The cover panel 200 may alternatively be referred to as a decoration panel or member 200.

Embodiments disclosed herein are not limited in a configuration of the first and second outer panels 310 and 320, cover panel 200, and display 400. Alternatively, the display 400 may be provided on a side (e.g., a rear side) of the tank 112 opposite to a side on which the cover panel 200 is provided so as to be further from the external heating elements 103 and 105.

An insulator 500 (FIGS. 11 and 14) may be provided between the first and second outer panels 310 and 320 and the tank 112. The insulator 500 may also be referred to as an insulation material or an insulation structure. The first and second outer panels 310 and 320 may be coupled to at least one of the insulator 500, the cap 350, the bottom panel 340, or each other. The cover panel 200 may be coupled to the third outer panel 330 (FIG. 9), which may be coupled to the insulator 500 and at least one of the first and second outer panels 310 and 320, the cap 350, or the bottom panel 340. Alternatively, the cover panel 200 may be coupled to at least one of the first and second outer panels 310 and 320, the cap 350, or the bottom panel 340. If the third outer panel 330 is omitted, the cover panel 200 may be coupled directly to the insulator 500.

Holes may be provided in the first outer panel 310 at portions corresponding to the inlet pipe 107 and the outlet pipe 109. The inlet pipe 107 may connect to an external commercial water supply (e.g., faucet), while the outlet pipe 109 may connect to an external drainage pipe.

The first outer panel 310 and the second outer panel 320 may be formed of an identical shape to allow for mass production and may be symmetrically fastened together and/or to the insulator 500. After mass production of the first and second outer panels 310 and 320 having an identical shape, holes may be drilled in the first outer panels 310. Then, the first outer panel 310 and the second outer panel 320 may be assembled by coupling (e.g., welding or snap fitting) the first outer panel 310 and the second outer panel 320 together and/or to the insulator 500 described later. The symmetrical, identical shape of the first and second outer panels 310 and 320 may streamline a manufacturing process to increase productivity.

Figure 6:
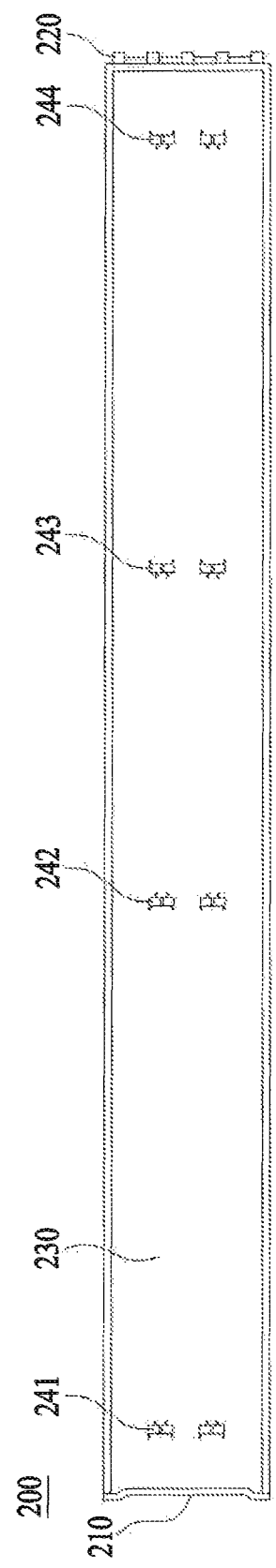
FIG. 6 is a view of a cover panel constituting part of the exterior the exterior of the water heater according to an embodiment.
Figure 8:
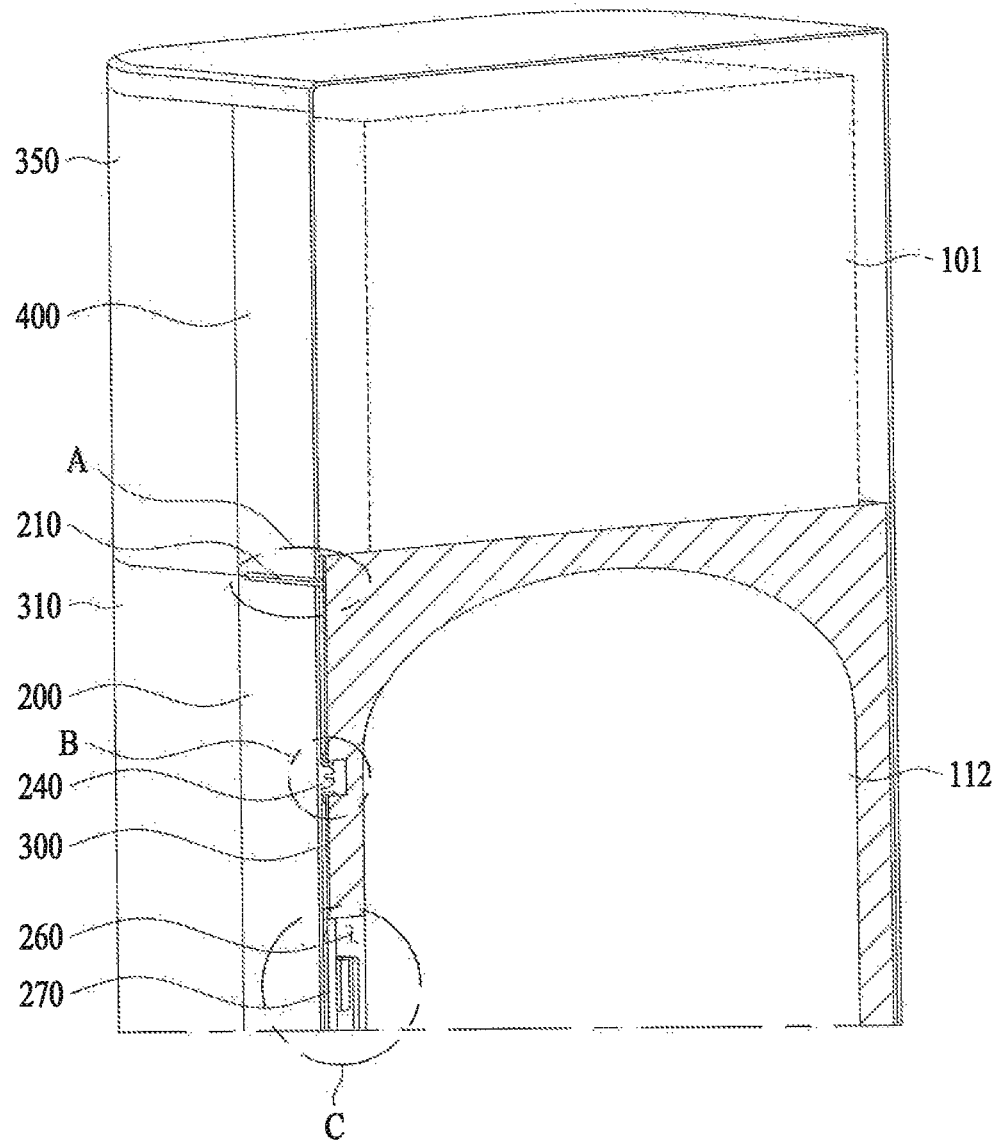
FIG. 8 is a longitudinal cross-sectional perspective view illustrating a fastened state of an external structure of the water heater according to an embodiment.

The cover panel 200 will be described in detail with reference to FIGS. 6 and 8. Referring to FIG. 6, the cover panel 200 may include a groove or bend 210, a plurality of locks 220, a main body 230, and a plurality of hooks 240.

The groove 210 may be provided at an upper portion of the cover panel 200 to allow for removal of the cover panel 200 from the first and second panels 310 and 320. The groove 210 may be a downward concave bend formed in an upper end of the cover panel 200. The groove 210 may provide a space into which a user's finger or tool may be inserted in order to pull the cover panel 200 outward and away from the tank 112. A user may easily detach the cover panel 200 from the first and second outer panels 310 and 320 and/or the third outer panel 330 by using a hand or a tool to pull the cover panel 200 from the groove 210. As the groove 210 may be a slight bend forming a small space between the cover panel 200 and the cap 350, the cover panel 200 may still appear to be integral with the display 400, and a pleasing appearance may be maintained. The groove 210 will be described in more detail later with reference to FIG. 9.

The plurality of locks 220 may be provided at a lower end of the cover panel 200. The plurality of locks 220 may be protrusions or ribs that are inserted into grooves formed at an upper edge of the bottom panel 340 and/or a separate support guide or structure provided at a bottom of the exterior of the liquid heater 100, Alternatively, grooves with which the locks 220 engage may be formed at a bottom of the third outer panel 330, The cover panel 200 may be easily attached to and detached from the rest of the liquid heater 100 via the groove 210 and the locks 220. The locks 220 may be in functional harmony with the groove 210, and when the user pulls the groove 210, the cover panel 200 may be pivotally detached at a bottom. The cover panel 200 may be detached without affecting positions of the first and second outer panels 310 and 320 for convenient maintenance and reparations.

The main body 230 may form outer and inner surfaces of the cover panel 200. The groove 210 may be integrally formed at an upper portion of the main body 230, and the locks 220 may be integrally formed at a lower portion of the main body 230. The hooks 240 may be provided at the inner surface of the main body 230. The main body 230 may provide structural stability or rigidity to the cover panel 200, especially when the main body 230 is formed integrally with the hooks 240 and locks 220. A configuration of the cover panel 200 may allow the manufacturing process to be streamlined, increasing productivity.

As described above, the outer surface of the main body 230 may be formed of a material or color identical or similar to that of the outer surface of the display 400. In addition, a width of the main body 230 may be formed to match a width of the display 400. When the cover panel 200 is fastened to the first and second outer panels 310 and 320, the liquid heater 100 may have a distinct and pleasing aesthetic appearance that is easy to identify.

Figure 7:
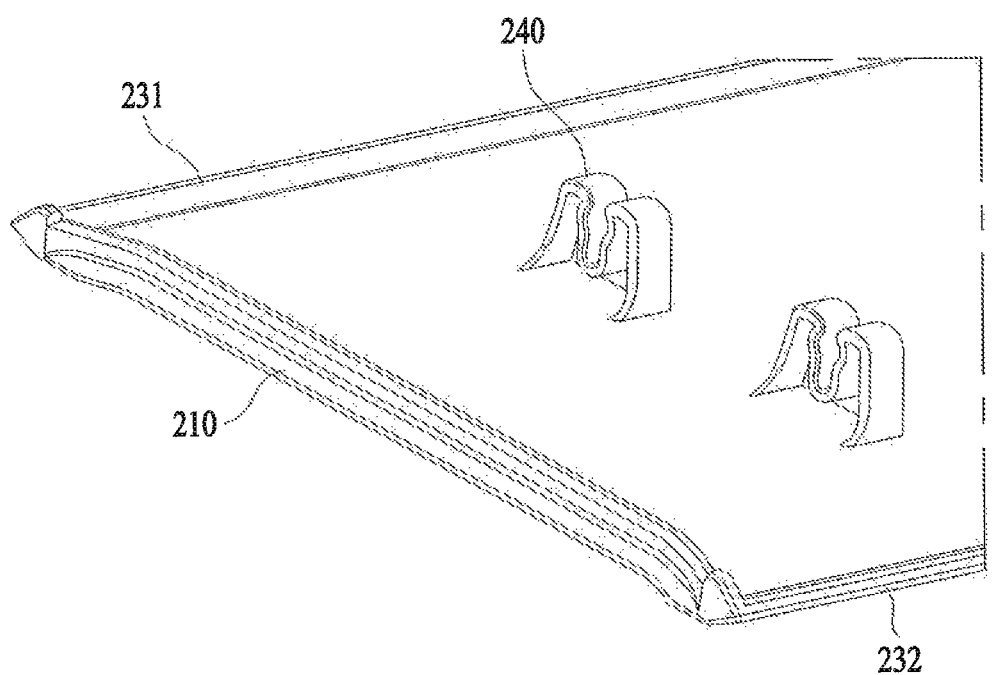
FIG. 7 is an enlarged perspective view of a cover panel of the water heater according to an embodiment.

Referring to FIG. 7, curved portions 231 and 232 may be formed at sides (e.g., left and right sides) of the main body 230. The curved portions 231 and 232 may improve bending stress of the main body 230 to counteract a load or an external force. When the cover panel 200 is attached between the first outer panel 310 and the second outer panel 320, an inclined surface may be formed by the curved portions 231 and 232 at positions adjacent to the first outer panel 310 and the second outer panel 320, respectively. The curved portions 231 and 232 will be described in more detail with reference to FIG. 13.

Referring back to FIG. 6, the hooks 240 may be formed on an inner surface of the cover panel 200 to protrude toward the tank 112 when the cover panel 200 is fastened. The hooks 240 may attach to grooves, recesses, or hook portions formed on an outer surface of the third outer panel 330 (FIG. 9). Each of the hooks 240 may have a tong shape to correspond to the hook portion of the third outer panel 330.

The hooks 240 may come in pairs, each pair being vertically spaced apart from an adjacent pair, to keep a coupling between the cover panel 200 and the third outer panel 330 stable and secure. The hooks 240 in each pair may align in a horizontal direction.

The plurality of hooks 240 may include four pairs of hooks 241, 242, 243, and 244 spaced apart in the vertical direction. The first pair of hooks 241 may be provided near the upper end and the groove 210, the fourth pair of hooks 244 may be provided near the lower end or the locks 220, and the second and third pairs of hooks 242 and 243 may be provided between and vertically align with the first and fourth pair of hooks 241 and 242. The hooks 240 will be described in more detail with reference to FIG. 10. A coupling of the cover panel 200, first and second outer panels 310 and 320, and the cap 350 will be described in detail with reference to FIGS. 8 through 14.

Figure 9:
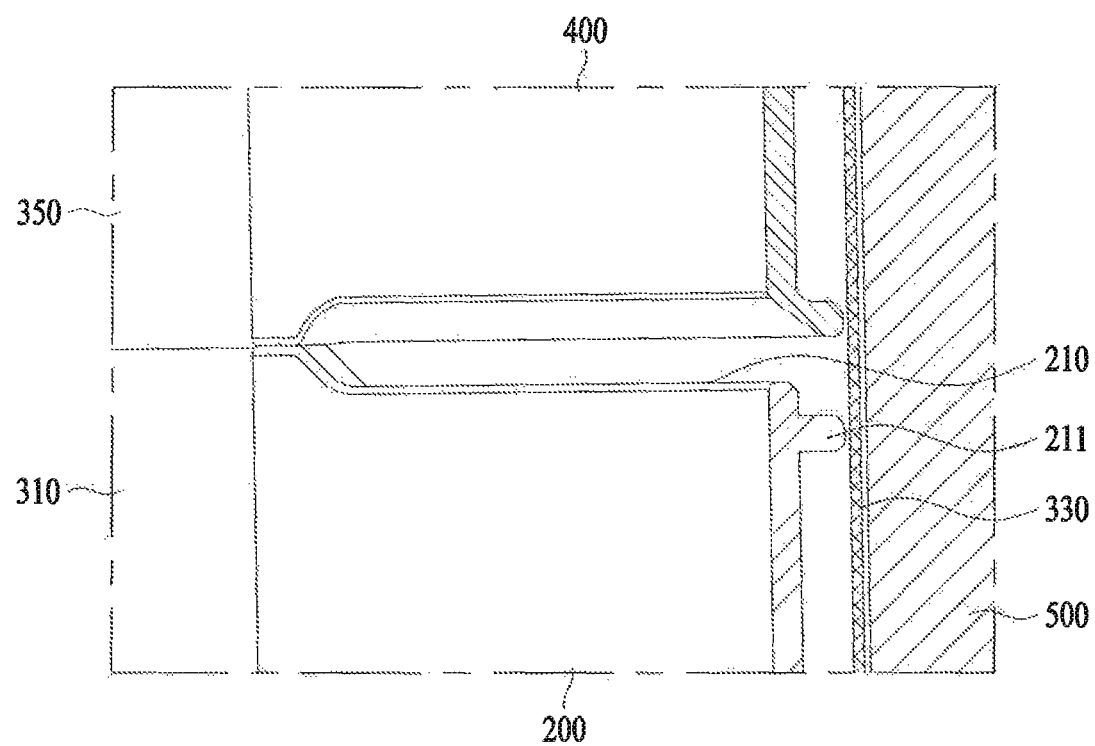
FIG. 9 is an enlarged cross-sectional perspective view of portion A of FIG. 8.
Figure 10:
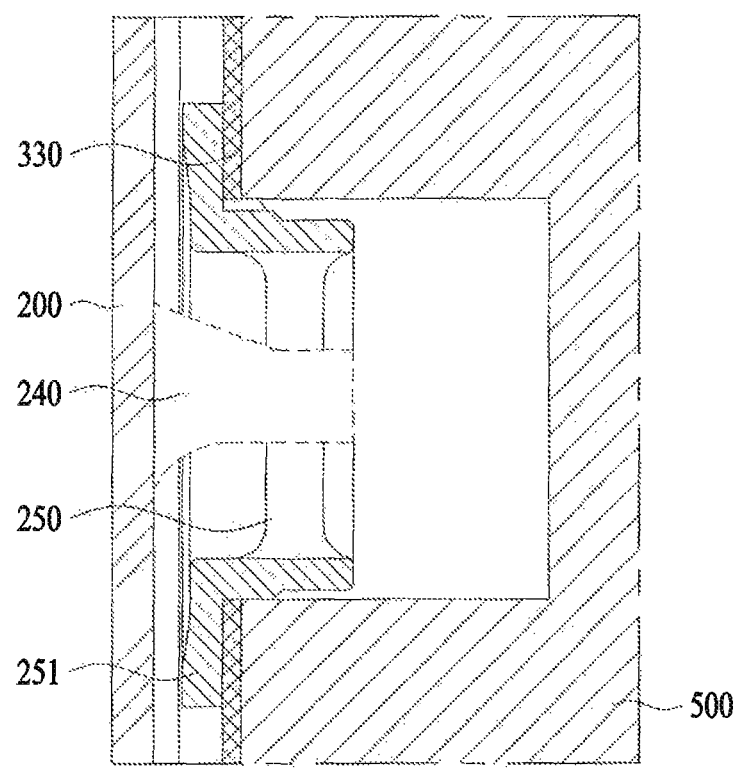
FIG. 10 is an enlarged cross-sectional view of portion B of FIG. 8.

Referring to FIGS. 9, 10, and 13, the exterior of the liquid heater 100 may include a third outer panel 330. The cover panel 200 may be coupled to the third outer panel 330, and the hook portions may be formed on an outer surface of the third outer panel 330.

Edges of the third outer panel 330 may be provided behind edges of the first and second outer panels 310 and 320. Alternatively or in addition thereto, the third outer panel 330 may be coupled to edges of the first and second outer panels 310 and 320 and/or the insulator 500 of the tank 112. As an alternative to the third outer panel 330, the hook portions may be formed on or attached to an outer surface of the insulator 500, and the cover panel 200 may be coupled directly to the insulator 500 and/or sides of the first and second outer panels 310 and 320. As another alternative to the third outer panel 330, at least one of the first or second outer panel 310 or 320 may be configured to extend beneath the display 400, and the cover panel 200 may be provided on top of the first and/or second outer panel 310 and/or 320.

A hole or opening may be formed in the third outer panel 330 where a fastening pillar 250 and a heater mount 262 described later may be provided. The hole of the third outer panel 330 may expose a heater mount 262 and a heater controller or circuit box 261 described later.

Referring to FIG. 13, the third outer panel 330 may be provided to be continuous with side edges of the first outer panel 310 and the second outer panel 320. Side edges of the third outer panel 330 may be overlapped with and optionally coupled to (e.g., adhered or bonded to) the side edges of the first outer panel 310 and the second outer panel 320 to secure a coupling.

The cover panel 200 may form a dual cover structure along with the third outer panel 330 to protect the heater circuit box 261 of the liquid heater 100 from condensate or other external obstacles. The cover panel 200 may be detached, while the third outer panel 330 may remain at an outside of the tank 112 and the insulator 500 during maintenance. The third outer panel 330 may be formed with a hole to expose the heater mount 262 and heater circuit box 261 (FIG. 11) described later, which may improve convenience during maintenance.

Alternatively, the third outer panel 330 may not be provided and the first outer panel 310 and the second outer panel 320 may form a dual cover structure along with the cover panel 200. In such an alternative, the first outer panel 310 and the second outer panel 320 may have an identical shape (e.g., demi-circles), the first outer panel may be drilled with holes to accommodate pipes (e.g., inlet and outlet pipes 117 and 119), the heater mount 262, and the heater circuit box 261, and the first outer panel 310 and the second outer panel 320 may be symmetrically fastened to the outside of the insulator 500 and/or to each other. Sides of the first outer panel 310 and the second outer panel 320 may be inclined inward so as to form a recession where the cover panel 200 is coupled such that the cover panel 200 is slightly spaced apart from the first and second outer panel 310 and 320. Furthermore, side edges of the first and second outer panels 310 and 320 may be overlapped with and coupled to each other. In another alternative, the third outer panel 330 may be formed integrally with at least one of the first outer panel 310 or the second outer panel 320.

A dual cover structure of the cover panel 200 and the third outer panel 330 (or alternatively, with the first and/or second outer panels 310 and/or 320) may reduce an amount of condensate interfering with the heater circuit box 261. As the cover panel 200 may be detached while first, second, and/or third outer panels 310, 320, and/or 330 remain around the tank 112, reparations to the heating mount 262 and/or the heater circuit box 261 may be convenient.

Referring to FIG. 9, while the cover panel 200 is fastened to the third outer panel 330, the groove 210 may form a downward concave space between an upper portion of the cover panel 200 and a bottom of the cap 350 so that a user may detach the cover panel 200 by pulling at the groove 210. A protrusion 211 may be formed at an upper side end of the cover panel 200 at a position adjacent to the groove 210. The protrusion 211 may serve as a guide to allow the user to correctly place and remove the cover panel 200 from the third outer panel 330. A lower end of the display 400 and/or the cap 350 may also be formed with a concave groove or recess and a protrusion to expand a gap formed between the cover panel 200 and the cap 350 to allow a user to insert a finger or tool in pulling the cover panel 200 from the third outer panel 330.

The concave shape of the groove 210 may be formed to correspond to a concave shape of the groove or recess formed in the display 400 and/or the cap 350. The groove 210 may be vertically symmetrical to the groove formed in the display 400 and/or the cap 350, improving uniformity in an appearance of the exterior of the liquid heater 100.

Referring to FIG. 10, a fastening pillar 250 may be provided at an outside of the third outer panel 330, and the hook 240 of the cover panel 200 may be fastened to the third outer panel 330 via the fastening pillar 250. The fastening pillar 250 may be formed integrally with the third outer panel 330, or may alternatively be formed separately with a coupling structure 251, which is coupled to the third outer panel 330 at a position above or below the hole of the third outer panel 330 through which the heater mount 261, etc. is exposed.

The hook 240 may be formed of an elastic material and/or have a tong shape configured to be elastic (e.g., plastic tongs). The tongs of the hook 240 may expand apart to slide around the fastening pillar 250, and inner ends of the tongs of the hook 240 may move back closer to each other at an inner side of the fastening pillar 250 via a restoring force. There may be a plurality of fastening pillars 250 shaped and positioned to correspond to the plurality of hooks 240 on the cover panel 250 so that the cover panel 200 may be secured and detached.

Figure 11:
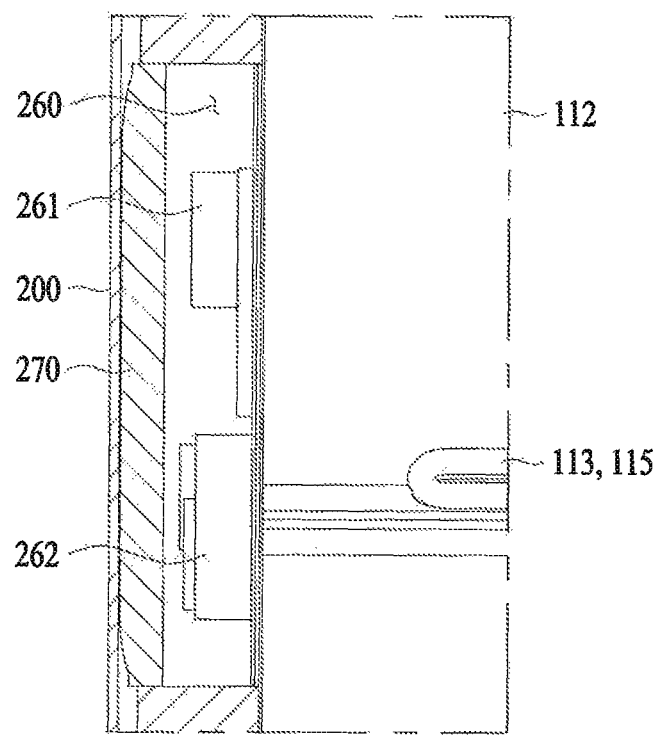
FIG. 11 is an enlarged cross-sectional view of portion C of FIG. 8.
Figure 12:
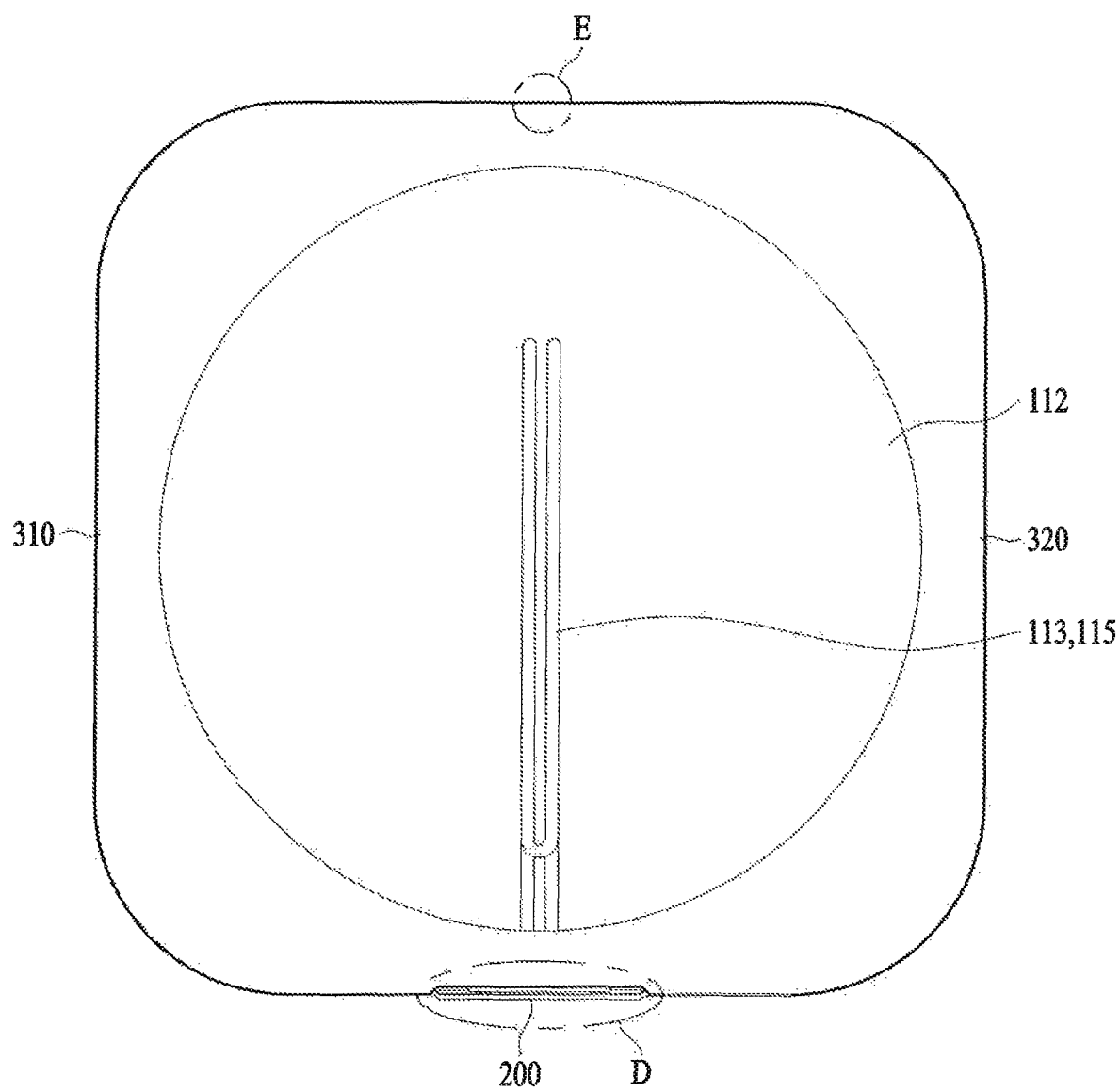
FIG. 12 is a transverse cross-sectional view illustrating a fastened state of the external structure of the water heater according to an embodiment.

Referring to FIG. 11, an interior of the tank 112 may include the heaters 113 and 115. A heater circuit box or controller 261 may safely supply power (i.e., electricity) to the heaters 113 and 115, and the heater mount 262 may support ends of the heaters 113 and 115 at an inner surface or wall of the water tank 112. The heater circuit box 261 may be provided on a printed circuit board or PCB.

The heater circuit box 261 and the heater mount 262 may be provided or embedded in the insulator 500 (e.g., a fiberglass insulation material or an insulation cushioning or cover) provided between an outer surface or wall of the water tank 112 and the exterior or case (i.e., the first, second, and third outer panels 310, 320, and 330) of the liquid heater 100. The heater circuit 261 and the heater mount 262 may be mounted in a heater space 260 that is formed in a space or gap of the insulator 500.

A heater cover 270 may be provided to at least partially cover the heater space 260. The cover panel 200 may be provided at an outer side of the heater cover 270 to cover the heater cover 270 and the heater space 260. The heater cover 270 may be made out of an insulating material, such as the insulating material that the insulator 500 is made out of, but embodiments disclosed herein are not limited. The heater cover 270 may fit within the holes formed in the third outer panel 330 to cover the heater circuit box 261 and the heater mount 262.

The heater circuit box 261 may operate via electricity and control an operation of the heaters 113 and 115. The heater circuit box 261 may malfunction upon penetration of condensate, which may affect safety. However, the dual cover structure of the cover panel 200 and the third outer panel 330 may protect the heater circuit 261 from condensate formed during the heating process to ensure a consistent heating function of the heaters 113 and 115, and may also prevent unintended or accidental contact of the heater circuit 261 by the user.

Referring to FIG. 13, the cover panel 200 may have curved portions 231 and 232 formed at side edges thereof to space the main body 230 apart from the third outer panel 330 by a predetermined distance. The curved portions 231 and 232 may have ends configured to be seated on the inclined edges of the first and second outer panels 310 and 320 so as to appear to be continuous with the first outer panel 310 and the second outer panel 320, enhancing a uniform appearance.

Figure 14:
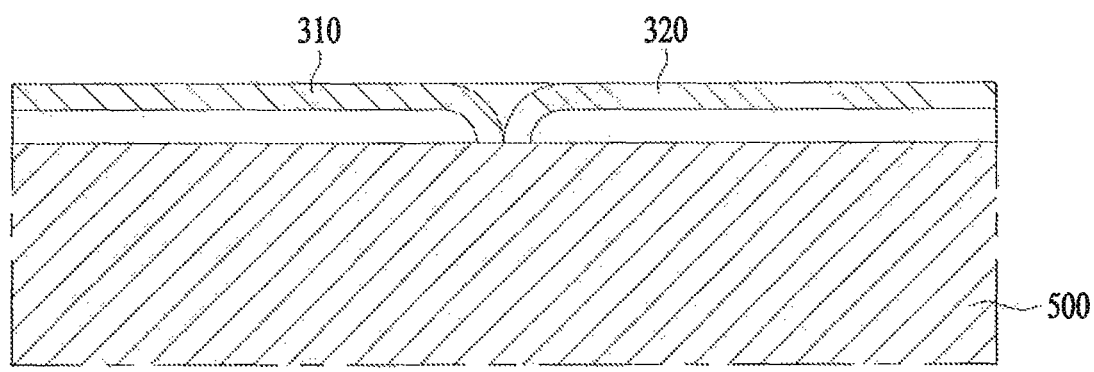
FIG. 14 is an enlarged cross-sectional view of portion E of FIG. 12.

Referring to FIG. 14, side edges of the first outer panel 310 and the second outer panel 320 at a side of the exterior of the liquid heater 100 opposite to the side having the cover panel 200 may be adjacent to each other. The side edges of the first and second outer panels 310 and 320 may be coupled to each other, or alternatively provided to contact each other. The side edges of the first outer panel 310 and the second outer panel 320 may be formed to curve inward, and such curved portions may be coupled to or contact each other. The side edges of the first outer panel 310 and the second outer panel 320 may be coupled to and/or contact the insulator 500.

Embodiments disclosed herein may provide a streamlined manufacturing process for an exterior of a liquid heater 100. After mass production of outer panels having an identical shape (e.g., semicircle shape), holes required for the first outer panel 310 may be drilled. Then, the first outer panel 310 and the second outer panel 320 may be assembled by symmetrically fastening the first outer panel 310 and the second outer panel 320 to the insulator 500 and/or to each other. The manufacturing process may be streamlined, increasing productivity.

Embodiments disclosed herein may provide a water or liquid heater having an external structure such as a cover panel to ensure functioning of an internal element or an electronic device such as a heater circuit by covering the internal element in a dual cover structure, which may protect such internal elements and reduce accidents. By facilitating an attachment and a detachment of the cover panel, manufacturing may have reduced steps, assembling may be quick, and maintenance may be convenient. Embodiments disclosed herein provide an aesthetic feature that gives a strong identity to the exterior of the water heater. The external structure of the water heater may provide physical protection so as to ensure smooth functioning of internal elements of the water heater. Embodiments disclosed herein may improve convenience in terms of maintenance by facilitating detachment and attachment of a cover panel forming the external structure of the water heater.

Embodiments disclosed herein may provide a water or liquid heater to stably protect internal elements such as a heater and preventing inadvertent access to such internal elements by a user, improving convenience by facilitating maintenance in terms of easy detachment, and providing an excellent aesthetic feature by forming an external appearance of the water heater. Embodiments disclosed herein may overcome limitations of an external structure according to existing or related water heaters and meet various functional or aesthetic needs.

Embodiments disclosed herein may be implemented as a water or liquid heater to heat liquid or water using at least one of an electric heater or a hybrid heat pump. The water heater may include a water or liquid tank having at least one heater to heat water supplied to the tank via a water inlet pipe. A water outlet pipe may discharge water heated up to a set temperature by the at least one heater. An insulation structure may be provided between an outside of the water tank and an external appearance or exterior case of the water heater.

An external structure may form or constitute the external appearance of the water heater and physically protect at least one element provided at the outer side the water tank or in the insulation structure. The external structure may include a first outer panel coupled or fastened to a first side of the water heater, a second outer panel coupled or fastened to a second side of the water heater opposite to the first side, and a cover panel coupled or fastened between the first outer panel and the second outer panel and detachable from the water heater to access the internal element.

The first outer panel and the second outer panel may be symmetrically fastened to the outside of the water heater. The first and second outer panels may have identical shapes so as to be mass produced. Holes may be formed in the first outer panel at portions corresponding to the water inlet pipe and the water outlet pipe.

The cover panel may be provided at an intermediate or middle portion of a side of the water heater or water tank.

The cover panel may be fastened to the water heater or the water tank. An outer surface of the cover panel may be formed to be continuous with outer surfaces of the first outer panel and the second outer panel.

An upper portion of the water heater may further include an upper panel covering the heat pump and provided with a display. A width of the cover panel may be formed to match a width of the display. The cover panel may be formed of a color or material identical to a color or material of the display.

A groove or recess may be formed at an upper end of the cover panel. A locking portion or protrusion may be formed at a lower end of the cover panel. A hook portion or tong of the cover panel may be formed to be detachable from a fastening pillar provided at the outside to the water heater or water tank and/or a third outer panel.

The hook portion of the cover panel may be formed in plural to be spaced apart in a vertical direction. The hook portion of the cover panel may be composed of at least two hooks in a horizontal direction.

A heater space may be provided in the insulation structure. The heater space may include a heater circuit configured to safely supply power to the heater and a heater fixing part or heater mount provided to support the heater against the water tank. The heater space may be protected by a heater cover and the cover panel.

A third outer panel may be coupled or fastened to an intermediate portion of the water heater. The cover panel may be fastened to an outside of the third outer panel to form a dual cover structure.

Embodiments disclosed herein may be implemented as a liquid heater comprising a tank configured to store liquid, an inlet pipe to supply liquid to the tank, a heater to heat the liquid to a predetermined temperature, an outlet pipe to discharge heated liquid at the predetermined temperature, an insulator provided at an outer surface of the tank, a space formed in the insulation structure, at least one electronic device 600 (e.g., a heater circuit box or heater controller) provided in the space of the insulation structure, and a case forming an external appearance provided at an outer side of the insulation structure. The case may include a first panel and a second panel partially covering the insulator to create a gap between sides of the first and second panels, the gap corresponding to the location of the space, and a cover panel provided between the first panel and the second panel at a position to cover the gap of the first and second panels, the cover panel being configured to be removed to allow access the electronic device.

The first panel and the second panel may be coupled to each other at a side of the tank that may be opposite to a side where the cover panel may be provided. The first panel and the second panel may have an identical shape. Holes may be formed in the first panel at positions corresponding to the inlet pipe and the outlet pipe, respectively.

Side edges of the cover panel may be inclined inward toward the tank and side edges of the first and second panels may be inclined toward the tank. The side edges of the cover panel may be provided over the side edges of the first and second panels so as to form a continuous outer surface of the case.

A heat pump may be provided above the tank. The case may include a cap configured to cover the heat pump. The cap may include a display to indicate a heating status of liquid stored in the tank.

The cover panel may be provided at a position below the display. A width of the cover panel may be equal to a width of the display. The cover panel may be formed of a color or material identical to a color or material of the display.

A groove may be formed at an upper end of the cover panel. At least one hook may be formed at a lower end of the cover panel. The hook may be configured to surround and couple to a fastening pillar provided at an outer side of the tank. The cover panel may include a plurality of hooks spaced apart in a longitudinal direction of the cover panel, which may be a longitudinal direction of the tank. The plurality of hooks may include pairs of hooks, each hook in a pair of hooks aligning in a horizontal direction and each pair of hooks being spaced apart in a vertical direction.

A heater circuit box may be provided in the space of the insulator and configured to supply power to the heater. A heater mount may be provided to support the heater at the tank. A heater cover may cover the space.

A third panel may be coupled to the tank. The cover panel may be coupled to an outer surface of the third panel to form a dual cover structure.

Ranges of applicability of the present disclosure should be apparent from the detailed description. It should be understood, however, that the detailed description and specific examples, such as the exemplified embodiments of the present disclosure, are given by way of illustration only, since various changes and modifications within the spirit and scope of the present disclosure will be apparent to those skilled in the art. It will be apparent to those skilled in the art that modifications and variations can be made without departing from the spirit and scope of the invention.

The detailed description should not be interpreted limitedly in every aspect and should be considered to be illustrative. The scope of the present disclosure should be determined by reasonable interpretations of the attached claims and every modification within the equivalent range are included in the scope of the present disclosure.

The embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid heater comprising:
a tank configured to store liquid;
an inlet pipe to supply liquid to the tank;
a heater to heat the liquid to a predetermined temperature;
an outlet pipe to discharge heated liquid at the predetermined temperature;
an electronic device provided at an outside of the tank;
an insulator provided at an outer surface of the tank;
a space provided in the insulator;
a heater mount provided in the space to support the heater;
a heater cover to cover the space, wherein the electronic device is a heater circuit box configured to supply power to the heater, and the heater circuit box is provided in the space; and
a case forming an external appearance provided at an outer side of the insulator and configured to cover the electronic device, wherein the case includes:
a first panel configured to cover a first portion of the insulator;
a second panel configured to cover a second portion of the insulator; and
a cover panel provided between the first panel and the second panel at a position to cover a gap between the first panel and the second panel and to contact each of the first panel and the second panel, and the cover panel being configured to be removed to allow access to the electronic device, and the cover panel being provided at an outer side of the heater cover to enclose the heater cover.

2. The liquid heater of claim 1, wherein the first panel and the second panel are coupled to each other at a side of the tank that is opposite to a side where the cover panel is provided.

3. The liquid heater of claim 1, wherein the first panel and the second panel have an identical shape.

4. The liquid heater of claim 1, wherein holes are formed in the first panel at positions corresponding to the inlet pipe and the outlet pipe, respectively.

5. The liquid heater of claim 1, wherein the cover panel is provided at a center of a side of the case.

6. The liquid heater of claim 1, wherein an outer surface of the cover panel is formed to appear continuous with outer surfaces of the first panel and the second panel.

7. The liquid heater of claim 6, wherein side edges of the cover panel are inclined inward toward the tank and side edges of the first and second panels are inclined toward the tank, and the side edges of the cover panel are provided over the side edges of the first and second panels so as to form a continuous outer surface of the case.

8. The liquid heater of claim 5, further comprising a heat pump provided above the tank, wherein the case includes a cap configured to cover the heat pump, and the cap includes a display to indicate a heating status of liquid stored in the tank.

9. The liquid heater of claim 8, wherein the cover panel is provided at a position below the display, and a width of the cover panel is equal to a width of the display.

10. The liquid heater of claim 8, wherein the cover panel is formed of a color or material identical to a color or material of the display.

11. The liquid heater of claim 1, wherein a groove is formed at an upper end of the cover panel.

12. The liquid heater of claim 11, wherein at least one hook is formed at a lower end of the cover panel.

13. The liquid heater of claim 12, wherein at least one of the hooks is configured to surround and couple to a fastening pillar provided at an outer side of the tank.

14. The liquid heater of claim 11, wherein the cover panel includes a plurality of hooks spaced apart in a longitudinal direction of the cover panel, which is a longitudinal direction of the tank.

15. The liquid heater of claim 14, wherein the plurality of hooks include pairs of hooks, each hook in a pair of hooks aligning in a horizontal direction and each pair of hooks being spaced apart in a vertical direction.

16. The liquid heater of claim 1, wherein a third panel is coupled to the tank, and the cover panel is coupled to an outer surface of the third panel to form a dual cover structure.

17. A liquid heater, comprising:
a tank configured to store liquid;
a heater to heat the liquid to a predetermined temperature;
an insulator provided at an outer surface of the tank;
a space formed in the insulator;
an electronic device provided in the space of the insulator;
a heater mount provided in the space to support the heater;
a heater cover to cover the space, wherein the electronic device is a heater circuit box configured to supply power to the heater, and the heater circuit box is provided in the space; and
a case provided at an outer side of the insulator, wherein the case includes:
  a first panel and a second panel partially covering the insulator to create a gap between sides of the first and second panels, the gap corresponding toa location of the space; and
  a cover panel provided between the first panel and the second panel at a position to cover the gap and contact each of the first panel and the second panel, the cover panel being configured to be removed to allow access to the electronic device, and the cover panel being provided at an outer side of the heater cover to enclose the heater cover.

18. The liquid heater of claim 17, wherein the heater is provided inside the tank, the heater mount is provided at an outside of the tank in the space, and a heat pump is provided above the tank.

\* \* \* \* \*